May 13, 1941.  E. F. LOWEKE  2,241,728
BRAKE
Filed Sept. 10, 1938
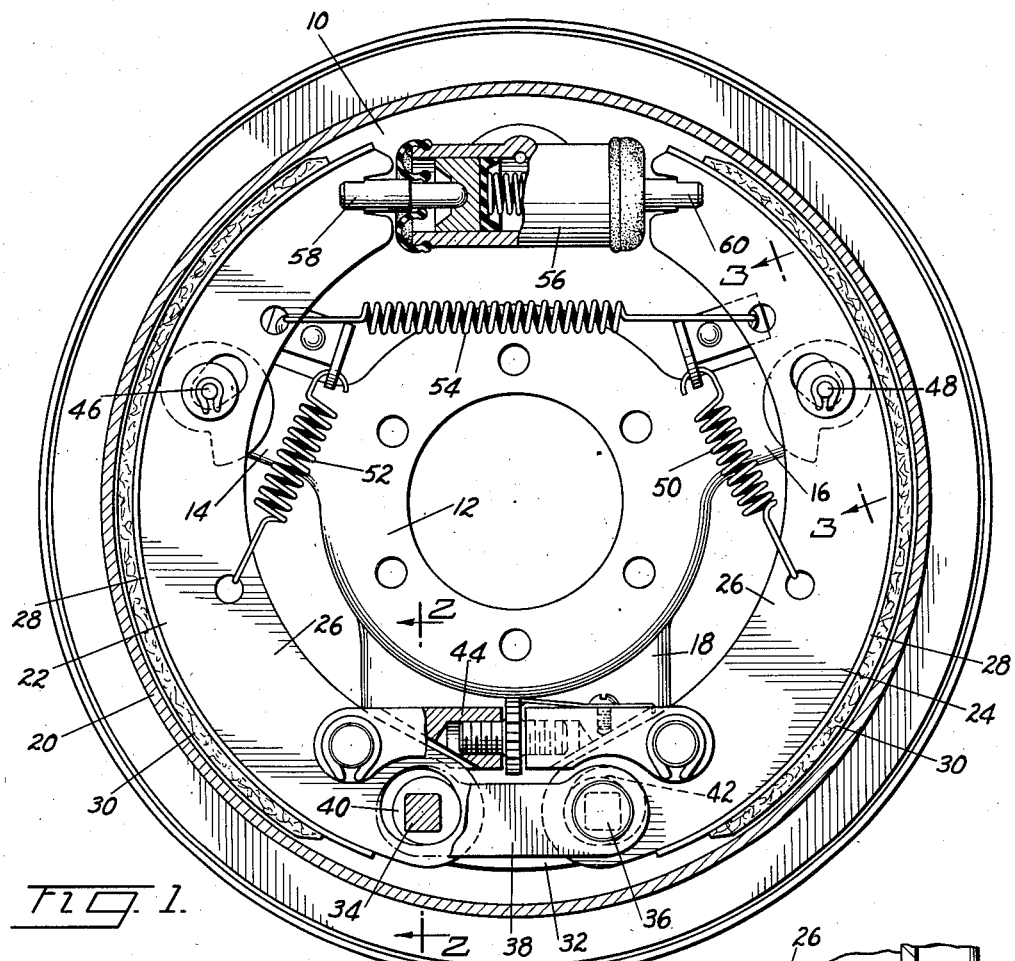
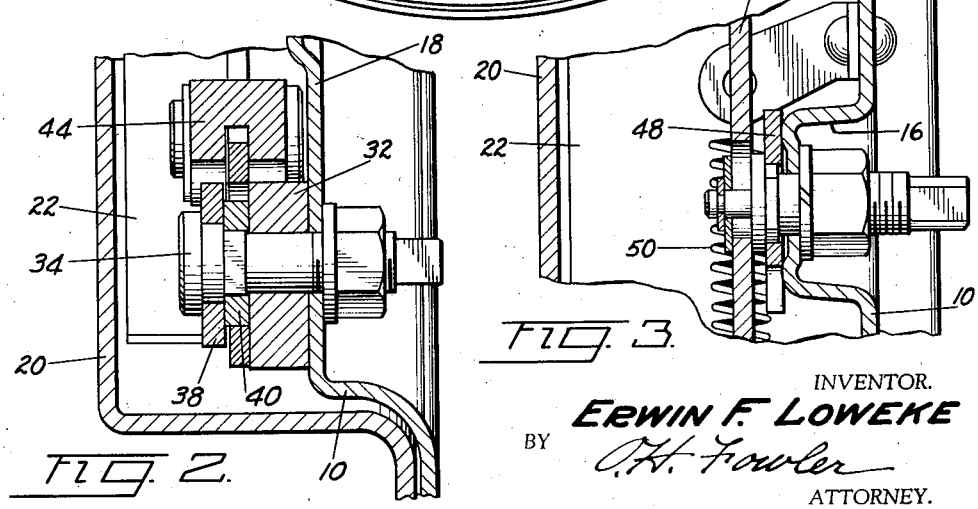
INVENTOR.
ERWIN F. LOWEKE
BY
C. H. Fowler
ATTORNEY.

Patented May 13, 1941

2,241,728

UNITED STATES PATENT OFFICE 2,241,728

BRAKE

Erwin F. Loweke, Detroit, Mich., assignor to Hydraulic Brake Company, Detroit, Mich., a corporation of California Application September 10, 1938, Serial No. 229,366

11 Claims. (Cl. 188—78)

This invention relates to brakes, and more particularly to internal expanding brakes for motor vehicles.

An object of the invention is to provide an internal expanding brake of the shiftable anchorage type wherein uniformity of action in forward and reverse braking may be attained.

Another object of the invention is to provide a brake including a forward braking shoe and a reverse braking shoe so connected and actuated that the effectiveness of the reverse braking shoe is equal to that of the forward braking shoe.

A further object of the invention is to provide a brake including a pair of shiftably anchored braking shoes so connected and actuated as to balance the pressure on the shoes in both forward and reverse braking.

Yet a further object of the invention is to provide a brake of the internal expanding type including a pair of shiftably anchored braking shoes so connected and actuated that the applied force on the forward braking shoe, augmented by the wiping action of the drum, may be partially transmitted to the reverse braking shoe so as to increase its effectiveness.

Other objects and advantages of the invention will appear from the following description taken in connection with the drawing forming a part of this specification, and in which:

Fig. 1 is a vertical sectional view of a brake embodying the invention;

Fig. 2 is an enlarged sectional view substantially on line 2—2, Fig. 1; and

Fig. 3 is an enlarged sectional view substantially on line 3—3, Fig. 1.

Referring to the drawing for more specific details of the invention, 10 represents a fixed support or backing plate having a concentrically disposed raised annular portion 12 and raised radial portions 14, 16 and 18. The backing plate has associated therewith a rotatable drum 20, and a pair of corresponding interchangeable friction elements or shoes 22 and 24 are supported on the backing plate for cooperation with the drum. Each of the shoes 22 and 24 includes a web 26 supporting a rim 28 having secured thereon a lining 30 suitable for frictional engagement with the drum 20.

A reinforcing member 32 fixedly secured on the raised portion 18 of the backing plate provides a suitable mounting for a pair of spaced corresponding adjustable anchor pins 34 and 36 secured together by an anchor pin strap 38, and suitably mounted on the anchor pins between the reinforcing member 32 and the strap 38 are cams 40 and 42.

The articulate ends of the shoes have openings therein for the reception of the cams 40 and 42 with substantial clearance to provide for slight relative movement, and the shoes are connected to one another adjacent their articulate ends by an adjustable link 44 of conventional type. Corresponding combined guides and adjustable retractile stops 46 and 48, mounted respectively on the radial portions 14 and 16 of the backing plate, serve to guide the shoes during movement thereof and also to support the shoes in proper spaced relation to the drum when the shoes are in retracted position. The shoes are connected respectively by springs 50 and 52 to fixed supports arranged on the backing plate so as to centralize the shoes, and a retractile spring 54 connecting the shoes adjacent their separable ends serves to return the shoes, upon completion of a braking operation, to their retracted position and to retain them against the retractile stops 46 and 48 when in the retracted position.

A fluid pressure actuated motor 56, mounted on the backing plate between the shoes 22 and 24 and connected to the separable ends of the shoes as by thrust rods 58 and 60, is operative to actuate the shoes into engagement with the drum 20 against the resistance of the retractile spring 54.

In a normal operation of the brake, upon energization of the motor 56, the shoes 22 and 24 are moved from their position of rest against the retractile stops 46 and 48 into engagement with the drum 20 against the resistance of the retractile spring 54. When this occurs during a forward braking operation, the wiping action of the drum shifts the shoes bodily so as to anchor the shoes on the anchor pin 36. Under this condition, the applied force, augmented by the wiping action of the drum, is partially transmitted from the forward braking shoe 22 through the adjustable connecting link 44 to the reverse braking shoe 24 so as to increase the effectiveness of the reverse braking shoe and to balance the pressure on the respective shoes. In a reverse braking operation, the wiping action of the drum shifts the shoes so that they anchor on the anchor pin 34, and, under this condition, the applied force, augmented by the wiping action of the drum, is partially transmitted from the braking shoe 24 through the connection 44 to the braking shoe 22 to increase its effectiveness and to balance the pressure on the shoes.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a pair of spaced anchors, a pair of braking shoes each shiftable on one of the anchors in both directions of braking, an adjustable link connecting the shoes within the radius of the anchors, and means for actuating the shoes.

2. A brake comprising a pair of spaced anchors, a pair of corresponding braking shoes each shiftable on one of the anchors in both directions of braking, an adjustable link connecting the shoes within the radii of the anchors, and a motor for actuating the shoes.

3. A brake comprising a fixed support, a rotatable drum associated therewith, a pair of spaced anchors on the support, a pair of shoes each shiftable on one of the anchors in both directions of braking, a link connecting the shoes adjacent their anchored ends within the radii of the anchors, and a fluid pressure actuated motor connected to the force applying ends of the shoes.

4. A brake comprising a fixed support, a rotatable drum associated therewith, spaced anchors on the support, a pair of corresponding shoes for cooperation with the drum having openings in their articulate ends for the reception of the anchors with clearance, an adjustable link connecting the shoes adjacent their articulate ends within the radii of the anchors, and a motor connected between the separable ends of the shoes.

5. A brake comprising a fixed support, a rotatable drum associated therewith, a pair of spaced anchors on the support, a pair of corresponding shoes for cooperation with the drum having openings in their articulate ends for the reception of the anchors with clearance, an adjustable link connecting the shoes within the radii of the anchored ends thereof so that force may be transmitted from the forward braking shoe to the reverse braking shoe, and a motor connected between the force applying ends of the shoes.

6. A brake comprising a fixed support, a rotatable drum associated therewith, a pair of spaced anchors on the support, a pair of braking shoes loosely mounted on the anchors for cooperation with the drum, means connecting the shoes within the radii of the anchored ends thereof serving to anchor one of the shoes to the other during a braking operation, and means for actuating the shoes.

7. A brake comprising a fixed support, a rotatable drum associated therewith, a pair of spaced anchors on the support, a pair of braking shoes loosely mounted on the anchors for co-operation with the drum, means connecting the shoes within the radii of the anchored ends thereof for anchoring the forward braking shoe to the reverse braking shoe in either forward or reverse braking, and a fluid pressure actuated motor connected between the force applying ends of the shoes.

8. A brake comprising a fixed support, a rotatable drum associated therewith, a pair of spaced anchors on the support, a pair of brake shoes loosely pivoted on the anchors and each shiftable in both directions of braking for cooperation with the drum, said shoes anchoring on one only of the anchors in forward and reverse braking, an adjustable link connecting the shoes within the radii of the anchors, and means for actuating the shoes.

9. A brake comprising a fixed support, a rotatable drum associated therewith, a pair of spaced anchors on the support, a pair of shoes pivoted on the anchors with clearance providing for shifting of each shoe in both directions of braking for cooperation with the drum, an adjustable link connecting the shoes within the radii of the anchors, said shoes anchoring on one of the anchors during forward braking and on the other anchor during reverse braking, and means for actuating the shoes.

10. A brake comprising a fixed support, a rotatable drum associated therewith, a pair of spaced anchors on the support, a pair of corresponding interchangeable shoes pivoted on the anchors with substantial clearance providing for shifting of both of the shoes in both directions of braking for cooperation with the drum, an adjustable link connecting the shoes within the radii of the anchors for transmitting force from one shoe to the other, the shoes anchoring on one only of the anchors in either direction of braking, and means for actuating the shoes.

11. A brake comprising a fixed support, a rotatable drum associated therewith, a pair of spaced anchors on the support, a pair of shoes for cooperation with the drum pivotally mounted on the anchors with substantial clearance providing for shifting of both of the shoes in both directions of braking, and a link connecting the shoes within the radii of the anchors, said shoes anchoring during operation of the brake on the anchor of the reverse braking shoe.

ERWIN F. LOWEKE.